Figure 1:
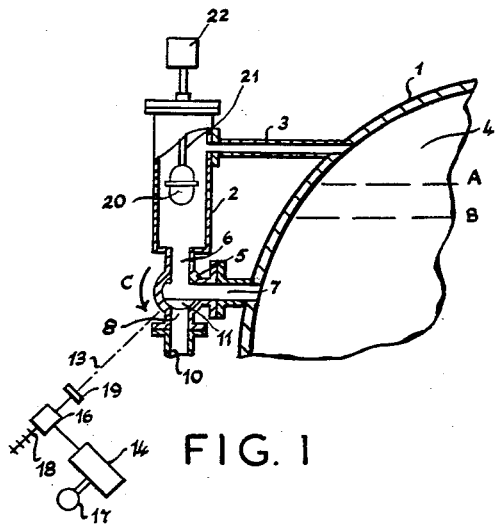

Oct. 30, 1962 C. A. HOWE 3,060,717
MONITORING DEVICE FOR FLUID LEVEL INDICATORS
Filed Oct. 19, 1959 2 Sheets-Sheet 1

Inventor
Cyril Arthur Howe
By Michael S. Striker
Attorney

United States Patent Office 3,060,717
Patented Oct. 30, 1962

3,060,717
MONITORING DEVICE FOR FLUID LEVEL
INDICATORS
Cyril Arthur Howe, Amersham, England, assignor to
Cleaver-Brooks Company, Milwaukee, Wis., a corporation of Wisconsin
Filed Oct. 19, 1959, Ser. No. 847,268
Claims priority, application Great Britain Oct. 20, 1958
13 Claims. (Cl. 73—1)

The present invention relates to a monitoring device adapted to check periodically whether a level indicator associated with a fluid container is functioning correctly.

In many physical and chemical processes it is essential that the level of a fluid in a container should not be allowed to fall below a certain level. To quote an example, it is very important that the water in a water boiler should not fall below a certain danger level. If the water is allowed to fall below this danger level there is a considerable risk that the crown of the boiler may collapse.

In the case of a water boiler it has been proposed to arrange a chamber connected in parallel with the boiler (i.e. with the upper end of the chamber connected to the steam space above the normal water level and the lower end of the chamber connected to the boiler below said danger level). In this chamber there is arranged a level indicator such as a float which rises and falls as the water level rises and falls in the boiler. This float is arranged to operate an electric switch, or some other suitable control device, if the water level in the boiler falls below a predetermined level. The operation of this switch or control device can be made to actuate a visible or audible alarm and/or cut off the fuel supply to the boiler. When such a boiler has been in operation for some time, scale and sludge begin to accumulate in the float chamber and there is a danger that these deposits may prevent the float from falling when the water level in the boiler falls. As a result the water level in the boiler may fall below said danger level without actuation of said switch or control device taking place.

The present invention provides a means for monitoring the rise or fall of a level indicator in a chamber containing a fluid which supports the level indicator.

According to the invention such a monitoring device comprises valve means controlling variation in the level of the fluid in the chamber, means controlled by a timing mechanism for actuating said valve means automatically to effect a change in level of the fluid in the chamber, and means for indicating whether said level indicator has responded and/or has failed to respond to the change in level of the fluid in the chamber following an actuation of said valve means.

Said indicating means may comprise an alarm device which gives a more or less immediate indication of the response or the failure to respond to the level indicator. The indicating means may also comprise a recording apparatus, such as a pen-recorder, to record the response and/or non-response of the level indicator to the change in level of the fluid in the chamber during monitoring processes.

The monitoring device in accordance with the invention is particularly suitable for monitoring automatically the functioning of a fluid level indicator comprising a float adapted to rise and fall in a float chamber separate from, but connected to, a container for the fluid whose level the float indicates. In this case, the monitoring device comprises valve means controlling the discharge of fluid from the float chamber, means controlled by a timing mechanism for automatically opening said valve means to discharge fluid from the chamber, and means for indicating that the float has fallen a predetermined amount and/or has failed to fall when said valve means is opened. Preferably said timing mechanism controls a prime mover which is arranged to open said valve means to exhaust the float chamber and then to return the valve means to its closed position.

If the cross-sectional area of the passageway through the open valve means is considerably larger than the cross-sectional area of the pipe connecting the float chamber to the fluid container, and if the wasting of a certain quantity of fluid from the container may be tolerated during the monitoring procedure, the connection between the lower end of the float chamber and the fluid container need not be closed when the valve means is opened to exhaust. It is preferred, however, to close the communication between the lower end of the float chamber and the fluid container during exhausting of the float chamber and it is convenient to arrange said valve means to perform this function as well. The valve means may also be arranged to connect the fluid container separately to exhaust so that from time to time the existence of a clear passage in the connection between the valve means and the container may be checked.

Preferably the valve means is connected to its automatic control means through a clutch to enable manual operation of the valve means when the clutch has been disengaged.

Figure 2:
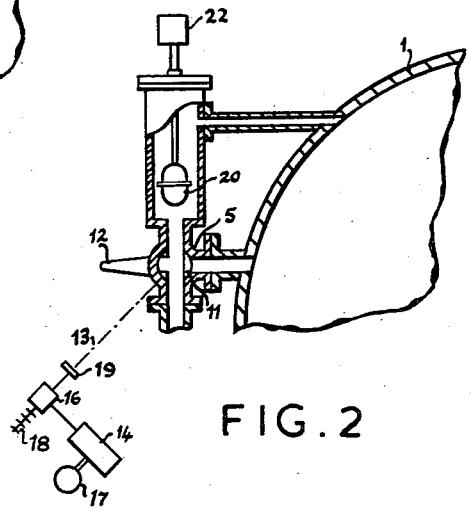
Figure 3:
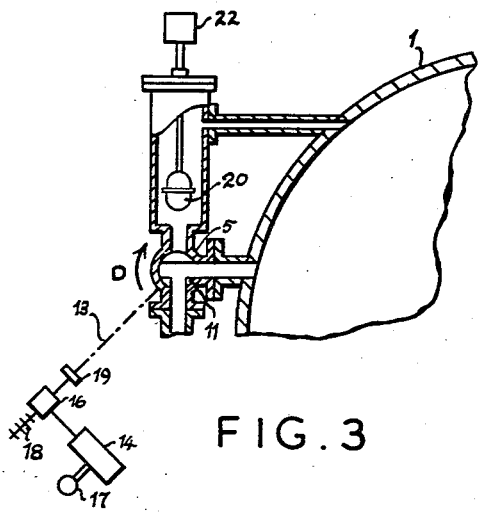
Figure 4:
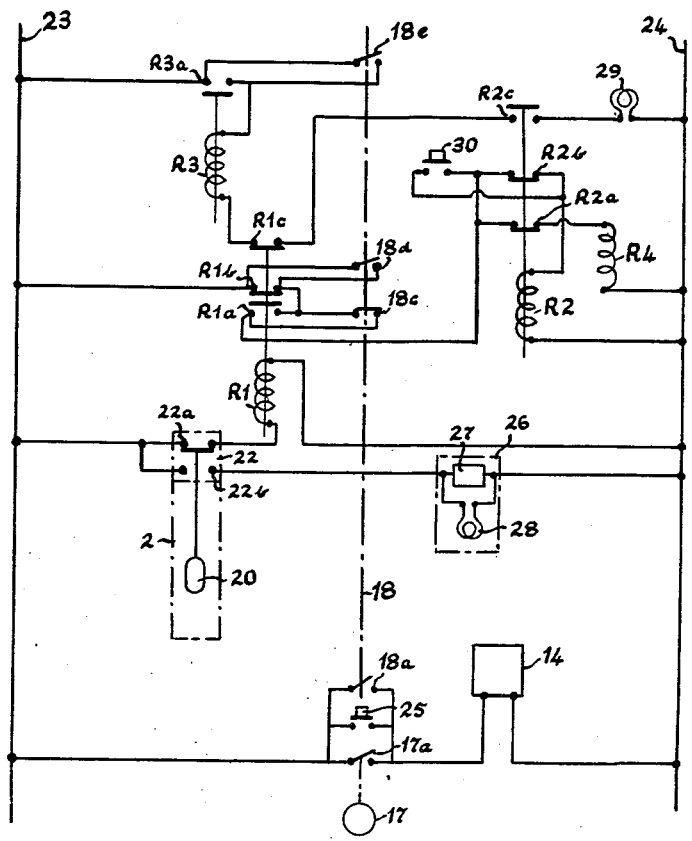

One form of monitoring device in accordance with the invention, which is intended for monitoring the correct functioning of a float chamber water level indicator connected in parallel with an oil-fired water boiler, will now be described, by way of example, with reference to the accompanying drawings, in which FIGURES 1 to 3 are schematic, partly sectioned, views of a part of the boiler, the float chamber water level indicator and the monitoring device, showing the valve of the monitoring device in three different positions, and FIGURE 4 is a circuit diagram of the monitoring device.

Referring to FIGURE 1, numeral 1 designates part of the shell of the boiler in which the normal water level is at the line designated A. The line marked B indicates a danger level below which the water in the shell 1 must not be allowed to fall whilst the oil-firing of the boiler is in operation.

A float chamber or casing 2 is connected in parallel with the boiler shell 1. A pipe 3 joins the upper end of the float chamber 2 to the steam space 4 above the normal water line A. The lower end of the float chamber 2 is connected to the boiler shell 1 by a three-way cock 5. The latter comprises a first branch 6 connected to the lower end of the float chamber 2, a second branch 7 connected to the boiler shell 1 below the danger level B and a third branch 8 connected to a drain 10. The cock 5 also comprises a rotatable valve member 11 adapted to be turned into any one of three positions, shown in FIGURES 1 to 3, to connect any one of the three branches 6, 7 and 8 to either of the other two. The valve member 11 comprises a handle 12, shown in FIGURE 2 only, by means of which the valve member may be rotated manually.

The valve member 11 is arranged to be rotated by a shaft 13 which is driven slowly by a non-reversible electric motor 14 through a reduction gear and a reversing drive unit 16. The reversing drive unit 16 is arranged to reverse the direction of rotation of valve member 11 at the end of every 180° rotation of the latter. Thus when the motor 14 drives the valve member 11 in the direction of the arrow C from the position shown in FIGURE 1, the valve member will turn to the position shown in FIGURE 3 and will then turn back in the direction of the arrow D to the position shown in FIGURE 1. If the motor 14 were allowed to run continuously, the valve member 11 would continue to oscillate in this manner.

The motor 14 is normally energised to run at certain intervals only by means of a time switch 17.

The drive unit 16 drives a camshaft 18 which controls certain switching contacts during rotation of the cock 5 in a manner which will be described more fully hereinafter with reference to FIGURE 4. The drive to the cock 5 also comprises a normally engaged, manually operable clutch 19 by means of which the motor drive and camshaft 18 can be disconnected from shaft 13 to allow manual operation of the valve. The clutch 19 is spring-loaded into the engaged position and requires hand pressure to allow disengagement of the clutch and manual operation of the cock 5.

In the float chamber 2 is a float 20 joined to the lower end of a rod 21. The rising and falling of the float 20 in the float chamber 2 causes the rod 21 to actuate a double-pole double throw switch 22 mounted on the top of the float chamber.

In FIGURE 4, the same reference numerals have been employed to designate items already described with reference to FIGURES 1 to 3. In FIGURE 4 it will be seen that the motor 14 is connected between a phase line 23 and a neutral line 24 in series with the contact 17a of the time switch 17. Connected in parallel with the contact 17a are a contact 18a operated by the camshaft 18 and a control button 25. The float-controlled switch 22 has one contact pair 22a connected in series with the coil of a relay R1 between the lines 23 and 24. The switch 22 also has a contact pair 22b, connected in series with an alarm device 26 between the lines 23, 24. The alarm device 26 includes an audible alarm device 27 and a lamp 28. The remainder of the circuit includes three further relays R2, R3 and R4, camshaft-controlled contacts 18c, 18d and 18e, a lamp 29, and a manual re-set button 30. Relay R1 has three contact pairs R1a, R1b and R1c, relay R2 has three contact pairs R2a, R2b and R2c, and relay R3 has a contact pair R3a. Relay R4 (only the coil of which is shown) controls the shutting-down of the oil-firing apparatus of the boiler.

FIGURE 4 shows the various relay contact pairs, the contact 17a and the contacts controlled by the camshaft 18 in the positions they occupy when the motor 14 is de-energised, the cam shaft 18 is stationary and the cock 5 is in the position shown in FIGURE 1. This is the normal operating condition of the boiler assuming that the water level in the boiler is normal, i.e. at the level A, so that the contact 22a, of switch 22 is closed. Under these conditions contacts 17a, 18a, 18d and 18e, and the relay contact pairs R1a, R2c and R3a are all open, whilst contact 18c and relay contact pairs R1b, R1c, R2a and R2b are all closed. Relays R1, R2 and R4 are energised and relay R3 is de-energised.

If during operation of the boiler the water in the shell 1 falls below the danger level B the float 20 will drop in the chamber 2 with the result that contact pair 22a is opened and contact pair 22b is closed. Closing of contact pair 22b establishes a circuit to the alarm device 26 to warn the boiler attendant that the water level in the boiler is dangerously low. Opening of contact pair 22a de-energises relay R1 with the result that contact pair R1b opens. This leads to de-energisation of both the relays R2 and R4. De-energisation of relay R4 operates the oil-firing shut-down control of the boiler.

When the boiler attendant has taken the necessary action to restore the water level in the boiler to the correct level the float 20 rises in chamber 2 to reclose contact pair 22a and reopen contact pair 22b. Opening of contact pair 22b cuts off the alarm device 26. Closing of contact pair 22a re-energises relay R1 to restore the contact pairs of relay R1 to the condition shown in FIGURE 4. If the manual reset button 30 is now actuated the coil of relay R2 is energised, contact pair R2b closes and the relay holds itself in the energised state when the button 30 is released. The closing of contact pair R2a re-energises relay R4 and the oil-firing shut-down control is rendered inoperative. The entire circuit is then restored to the condition shown in FIGURE 4.

If for any reason the float 20 cannot fall in the chamber 2 when the water level in the boiler falls to the danger level B, the boiler attendant will not be warned of the serious condition existing in the boiler. The monitoring process now to be described indicates to the attendant from time to time whether or not the float 20 is free to fall in the float chamber 2.

The initiation of the monitoring process takes place automatically at regular intervals (for example, every four hours) by the time switch 17 closing its contact 17a. When contact 17a closes, the motor 14 commences to rotate, and the valve member 11 (FIGURE 1) moves in the direction of the arrow C and the camshaft 18 commences to rotate. As soon as the camshaft commences to rotate it closes contacts 18a, 18d and 18e. The closing of contact 18a establishes a holding circuit to maintain the motor 14 energised when, shortly after the closing of contact 18a, the time switch 17 reopens contact 17a.

If the float chamber 2 and float 20 are in correct working condition, the float 20 will drop when the valve member 11 approaches the position sohwn in FIGURE 2. This results in opening of contact pair 22a and closing of contact pair 22b. Closing of contact pair 22b establishes a circuit to the alarm device 26 and indicates to the boiler attendant that the float 20 has dropped in the chamber 2 which, so far as he is concerned, may be the result of a monitoring process or the falling of the water level in the boiler to the line B (FIGURE 1). The opening of contact pair 22a de-energises relay R1 to cause contact pairs R1b and R1c to open and contact R1a to close. The opening of contact pair R1b does not de-energise relays R2 and R4, since contact 18d is closed, and consequently the oil-firing shut-down control of the boiler remains inoperative.

When the valve member 11 reaches the position shown in FIGURE 2 the contact 18c is opened by camshaft 18. Continued movement of the valve member 11 takes it to the position shown in FIGURE 3, in which water can flow from the boiler through the pipe 8 and branch 7 of the cock 5 to the drain 10.

The valve member 11 now commences to rotate in the opposite direction through the action of the reversing drive unit 16, previously described. When the valve member 11 reaches the position of FIGURE 2 again, contact 18c recloses. Continued rotation of valve member 11 shuts off the connection between branches 6 and 8 of the cock 5 and re-establishes connection between branches 6 and 7, so that the float chamber 2 refills with water and float 20 rises to open contact pair 22b and close contact pair 22a. This re-energises relay R1 to close contact pairs R1b and R1c and to open contact pair R1a, and the alarm device 26 stops operating. This indicates to the attendant that the actuation of the alarm was the result of a monitoring procedure, and not a fall of the water level in the boiler to the danger level. In the latter case, it will be remembered, the alarm device continues to operate until the correct water level is restored in the boiler.

As the valve member 11 returns to the position of FIGURE 1 the camshaft 18 opens contacts 18a, 18d and 18e. The entire system has now been restored to the condition illustrated in FIGURE 4. The complete monitoring process described above is arranged to take place in a short period of time (for example, twelve seconds).

Now let it be assumed that for some reason (for example, an accumulation of sludge in the chamber 2) the float 20 is unable to fall when, shortly after the initiation of a monitoring process, the cock 5 is in a position in which the float chamber 2 is connected to the drain 10.

The monitoring procedure follows the same course as that described above up to the stage at which the contacts 18a, 18d and 18e are closed and the valve member 11 approaches the position shown in FIGURE 2. This time, however, the contact pair 22a is not opened by falling of the float 20 and relay R1 remains energised. When the valve member 11 reaches the position shown in FIGURE 2 the contact 18c opens to de-energise relay R2, causing closing of contact R2c and opening of contacts R2a and R2b. This de-energises relay R4 and initiates shutdown of the oil-firing of the boiler. Closing of relay contact pair R2c establishes a circuit to the lamp 29, which gives an indication to the boiler attendant that the float 20 has failed to fall in the chamber 2. Relay R3 is also energised and closes its holding-in contact R3a.

The valve member 11 then continues its rotation to the position shown in FIGURE 3 whereupon it reverses its direction of rotation and returns to the position shown in FIGURE 2 at which contact 18c closes again. Continued rotation of the valve member brings it back to the position of FIGURE 1 at which contacts 18a, 18d and 18e reopen. The opening of contact 18a stops the motor 14 to bring the valve member 11 to rest in the position of FIGURE 1. Relay R3 remains energised thorugh its holding-in contact R3a and the lamp 29 remains alight.

When the failure of the float 20 to descend has been rectified, the reset button 30 is depressed to re-energise relays R2 and R4. This extinguishes lamp 29 and de-energises relay R3 so that the entire system is restored to the condition shown in FIGURE 4. The re-energisation of relay R4 makes the oil-firing shut-down control inoperative once more.

If desired, the system may be provided with means for preventing re-energisation of relays R2 and R4, when press button 30 is depressed, until the failure of float 20 to descend has been rectified. To this end, the relay R3 may comprise a further contact pair (not shown) in series with the contact pair of press button 30. This further contact pair would be open in the energised condition of relay R3. When float 20 falls correctly in the float chamber relay R3 is de-energised by the opening of contact pair R1c with the result that the further contact pair of relay R3 closes and the press-button 30 then becomes effective for re-energising relays R2 and R4.

Closing of the press-button 25 at any time during operation of the boiler has the same effect as the closing of contact 17a by the time switch 17. In other words the press-button 25 may be employed to initiate a monitoring process in addition to the periodic monitoring initiated by the time switch.

If desired, the system may be provided with a second alarm device (not shown) which is actuated during the monitoring process instead of the alarm device 26. The latter alarm device then only comes into operation when the water level in the boiler falls to the danger level. To this end, a further contact (not shown) actuated by the camshaft 18 can be arranged to disconnect the alarm device 26 during monitoring and to connect in the additional alarm device.

If for any reason, it is desired to rotate the valve member 11 by hand, the latter must first be disconnected from the motor 14 and camshaft 18 by disengaging the clutch 19. The latter, as mentioned previously, is urged by a spring into its engaged position so that it is necessary for the attendant to hold the clutch disengaged while he actuates the valve member 11 manually with the handle 12. The reason for arranging the clutch 19 in this manner is to prevent the situation arising where the attendant forgets to re-engage the clutch 19 after a manual operation of the valve member 11. Unless the clutch is in the engaged position, it will be appreciated that an automatic monitoring procedure cannot be initiated. If desired, the time switch 17 may be provided with a further contact arranged to operate an electric locking device for the clutch 19. This locking device would come into operation shortly before initiation of a monitoring process by the time switch to prevent manual disengagement of the clutch by the boiler attendant just before a monitoring process commences.

The monitoring system described above is driven by an electric motor. The invention is not, however, limited to this feature, since any other suitable prime mover, such as a hydraulic motor or a steam motor may be employed for rotating the valve member 11. In the case where a hydraulic motor or a steam motor is employed for rotating the valve member 11, the control of the working fluid of the motor may be effected by suitable electrical control means actuated by the time switch 17. Alternatively, the latter may control a mechanical servo-mechanism which in turn controls the working fluid of the motor.

Again, the invention is not limited to the use of a three-way cock controlling the connection of the lower end of the float chamber either to the drain 10 or to the boiler shell. Thus, the motor driven cock 5 may be replaced by one or more solenoid operated valves.

Although the invention has been described in detail above with reference to a water level indicator for a water boiler, it will be appreciated that the invention may be employed with other liquid level indicators (including apparatus for indicating the level of molten metal in a container) and with apparatus for indicating the level of a gas or vapour in a container.

I claim:
1. Safety apparatus for a container containing a fluid, comprising a casing in communication with the container below the fluid level; a float disposed in said casing and supported by the fluid in said casing; an exhaust conduit in communication with said casing; a valve movable between three positions for connecting said casing with the container, for connecting said casing with said exhaust conduit, and for connecting the container with said exhaust conduit; a motor; a reversing drive means driven by said motor and operatively connected to said valve to shift said valve between said positions in a timed sequence; and monitoring means operatively connected to said reversing drive means and to said float for giving an indication when said float fails to fall in said casing after said casing is brought into communication with said exhaust conduit.

2. Safety apparatus for a container containing a fluid, comprising a casing in communication with the container below the fluid level; a float disposed in said casing and supported by the fluid in said casing; an exhaust conduit in communication with said casing; a valve movable between three positions for connecting said casing with the container, for connecting said casing with said exhaust conduit, and for connecting the container with said exhaust conduit; a motor; a reversing drive means driven by said motor and operatively connected to said valve to shift said valve between said positions in a timed sequence; a first signal connected to said float and operating when said float drops in said casing as a result of said casing being connected with said exhaust conduit and ceasing operating after said casing is connected with the container to refill said casing with fluid; a monitoring means comprising indicating means connected to said float, and a second signal connected to said indicating means and said reversing drive means and giving a signal when said float fails to fall in said casing after said casing is brought into communication with said exhaust conduit.

3. Safety appratus for a container containing a fluid, comprising a casing in communication with the container below the fluid level; a float disposed in said casing supported by the fluid in said casing; an exhaust conduit in communication with said casing; a valve rotatably mounted for connecting said casing with the container and for connecting said casing with said exhaust conduit and for connecting the container with said exhaust conduit; a motor; a reversing drive means driven by said motor and operatively connected to said valve to reverse the rotation of said valve after a pre-determined number of degrees rotation; and a monitoring means operatively connected to said reversing drive means and to said float for giving an indication when said float fails to fall in said casing after said casing is brought into communication with said exhaust conduit.

4. Safety apparatus for a container containing a fluid, comprising a casing in communication with the container below the fluid level; a float disposed in said casing and supported by the fluid in said casing; and exhaust conduit in communication with said casing; a valve rotatably mounted between said exhaust conduit and said casing for connecting said casing with the container and for connecting said casing with said exhaust conduit and for connecting the container with said exhaust conduit; a motor; a reversing drive means driven by said motor and operably connected to said valve to reverse the rotation of said valve after a pre-determined number of degrees rotation; a first signal electrically connected to said float and operating when said float drops in said casing as a result of said casing being in communication with said exhaust conduit and ceases operating after said casing is brought into communication with the container refilling said casing with fluid; a monitoring means comprising indicating means connected to said float, and a second signal electrically connected to said indicating means in said reversing drive means and giving a signal when said float fails to fall in said casing after said casing is brought into communication with said exhaust conduit.

5. Monitoring means for a float adapted to rise and fall in a casing in communication with a container for the fluid whose level the float indicates; said monitoring means comprising a three-way cock having a first branch connected to the casing, a second branch connected to the fluid container, and a third branch connected to exhaust; a timing mechanism; actuating means controlled by said timing mechanism for automatically and periodically actuating said three-way cock from a position in which said cock joins said casing to the fluid container into a position in which it joins the casing to exhaust and then restores said cock to the first mentioned position; and indicating means operatively connected to said actuating means and adapted to be connected to said float for giving an indication when said float fails to fall in said casing after said casing has been joined to exhaust by said actuating means controlled by said timing mechanism.

6. Monitoring means as set forth in claim 5 comprising means for producing another signal responsive to the float falling a predetermined distance when said three-way cock is actuated to allow the discharge of fluid from the casing.

7. Monitoring means for a float adapted to rise and fall in a casing in communication with a container for the fluid whose level the float indicates; said monitoring means comprising a three-way cock having a first branch connected to the casing, a second branch connected to the fluid container, and a third branch connected to exhaust; a timing mechanism; actuating means controlled by said timing mechanism for automatically and periodically actuating said three-way cock from a position in which said cock joins the casing to the fluid container to each of two positions in which said cock joins the casing and the container respectively to exhaust before returning said cock to the first mentioned position; and indicating means operatively connected to said actuating means and adapted to be connected to said float for giving an indication when said float fails to fall in said casing after said casing has been joined to exhaust by said actuating means controlled by said timing mechanism and for giving an indication when said float fails to rise in said casing after the cock has been returned to the first-mentioned position following the respective joining to exhaust of said casing and the container.

8. Monitoring means as set forth in claim 7 comprising means for producing another signal responsive to the float falling a predetermined distance when said three-way cock is actuated to allow the discharge of fluid from the casing.

9. Monitoring means for a float adapted to rise and fall in a casing in communication with a container for the fluid whose level the float indicates; said monitoring means comprising a three-way cock having a first branch connected to the float chamber, a second branch connected to the fluid container, and a third branch connected to exhaust; a timing mechanism; actuating means controlled by said timing mechanism for automatically and periodically actuating said three-way cock from a position in which said cock joins the casing to the fluid container into a position in which it joins the casing to exhaust and then restores said cock to the first mentioned position; and indicating means operatively connected to said actuating means and adapted to be connected to said float for giving an indication when said float fails to fall in said casing after said casing has been joined to exhaust by said actuating means controlled by said timing mechanism, said indicating means including first normally opened electric contact means in said casing adapted to be closed by said float when the said float falls to a predetermined low position in the said casing and electric circuit means connected to said first contact means and including an indicating device.

10. Monitoring means for a float adapted to rise and fall in a casing in communication with a container for the fluid whose level the float indicates; said monitoring means comprising a three-way cock having a first branch connected to said casing, a second branch connected to the fluid container, and a third branch connected to exhaust; a first normally open electric contact means in the casing adapted to be closed by the float when the latter falls to a predetermined low position in the casing; an electric circuit connected to said first contact means and including an indicating device; a second normally closed electric contact means in the casing adapted to be opened by the float when the latter falls in the casing below a predetermined level; an electric circuit connected to said second contact means and including a relay controlling a first switch means and adapted to maintain said first switch means closed as long as said second electric contact means is closed; a timing mechanism; means controlled by said timing mechanism for automatically and periodically actuating said three-way cock from a position in which said cock joins the casing to the fluid container into a position in which it joins the casing to exhaust and then restores said cock to the first-mentioned position; an auxiliary electric circuit connected to said first switch means and including a second normally open switch means and an indicating device in series with said first switch means; and means for closing said second switch means during actuation of said three-way cock whereby said indicating device is energized if during actuation of said three-way cock, said float fails to descend to open said second normally closed contact means.

11. Safety apparatus for a container containing a fluid, comprising a casing in communication with the container below the fluid level; a float disposed in said casing and supported by the fluid in said casing; an exhaust conduit in communication with said casing; a valve movable between three positions for connecting said casing with the container, for connecting said casing with said exhaust conduit, and for connecting the container with said exhaust conduit; prime mover means operatively connected to said valve for shifting said valve between said positions in a timed sequence that includes returning the valve to the sequence starting position; and monitoring means operatively connected to said prime mover means and to said float for giving an indication when said float fails to fall in said casing after said casing is brought into communication with said exhaust conduit.

12. Monitoring means for a float adapted to rise and fall in a casing in communication with a container for the fluid whose level the float indicates; said monitoring means comprising a three-way valve means for providing a first branch connected to the casing, a second branch connected to the fluid container, and a third branch connected to exhaust; manual actuating means for actuating said three-way valve means from a position in which said valve means joins said casing to the fluid container into a position in which it joins the casing to exhaust and then restores said valve means to the first mentioned position; and indicating means operatively connected to said actuating means and adapted to be connected to said float for giving an indication when said float fails to fall in said casing after said casing has been joined to exhaust by said actuating means.

13. The monitoring means according to claim 12 wherein said means for producing a signal comprises means for producing said signal responsive to the failure of the float to rise in the casing after the three-way valve means has been returned to the first-mentioned position following the respective joining to exhaust of the casing and the container.

References Cited in the file of this patent
UNITED STATES PATENTS 21,836   Johnson et al. _____ Oct. 19, 1858

FOREIGN PATENTS 11,057   Great Britain _____ 1894